US007339287B2

(12) United States Patent
Jepsen et al.

(10) Patent No.: US 7,339,287 B2
(45) Date of Patent: Mar. 4, 2008

(54) POWER CONVERTER

(75) Inventors: Aksel Baagoe Jepsen, Augustenborg (DK); Nils-Ole Harvest, Nordborg (DK); Uffe Vikoeren Borup, Soenderborg (DK)

(73) Assignee: PowerLynx A/S, Soenderborg (DK)

( * ) Notice: Subject to any disclaimer, the term of this patent is extended or adjusted under 35 U.S.C. 154(b) by 216 days.

(21) Appl. No.: 10/518,603

(22) PCT Filed: Jun. 20, 2003

(86) PCT No.: PCT/DK03/00422

§ 371 (c)(1),
(2), (4) Date: Jun. 27, 2005

(87) PCT Pub. No.: WO04/001942

PCT Pub. Date: Dec. 31, 2003

(65) Prior Publication Data

US 2005/0275386 A1    Dec. 15, 2005

(30) Foreign Application Priority Data

Jun. 23, 2002    (DK) ............................... 2002 00966

(51) Int. Cl.
*H02J 1/00*    (2006.01)
(52) U.S. Cl. ...................................................... 307/82
(58) Field of Classification Search .................. 307/82; 363/16, 17
See application file for complete search history.

(56) References Cited

U.S. PATENT DOCUMENTS 5,625,539 A * 4/1997 Nakata et al. ................ 363/17

6,563,718 B1 * 5/2003 Li et al. ...................... 363/16

FOREIGN PATENT DOCUMENTS

DE    199 19 766 A1    11/2000

* cited by examiner

*Primary Examiner*—Robert L. Deberadinis
(74) *Attorney, Agent, or Firm*—McCormick, Paulding & Huber LLP (57) ABSTRACT

A power converter for converting energy from a green power unit as e.g. a solar cell into energy fed into the commercial grid is described. The object is to provide a versatile modularized power converter with eased access to control of the power switches. Another object is to improve the electrical efficiency. This is achieved by using an independent controller on a DC/DC module and an independent controller on a DC/AC module, whereby the two independent controllers communicate with each other and the outside world by means of a communication bus. Further, the DC/DC module of the power converter comprises a transformer which transfers energy from the DC/DC module to the DC/AC module. This design enables independent control of the modules and eases controllability of the power switches in order to suppress retroaction from pulsations generated on the mains when supplying energy to a single phase grid. Hereby the electrical efficiency of the power converter is increased. Also, an active snubber circuit is described which further increase the efficiency.

22 Claims, 8 Drawing Sheets

POWER CONVERTER

CROSS REFERENCE TO RELATED APPLICATIONS

This application is entitled to the benefit of and incorporates by reference essential subject matter disclosed in international Patent Application No. PCT/DK2003/000422 filed on Jun. 20, 2003 and Danish Patent Application No. PA 2002 00966 filed on Jun. 23, 2002.

FIELD OF THE INVENTION

The invention concerns a power converter for use in green power applications, and concerns particularly a module concept. "Green power" is the term used for energy sources like wind, sun or fuel cells, and the inventive power converter can be used for these different sources of electrical energy.

BACKGROUND OF THE INVENTION

The power generated by green power units is converted into a voltage and a frequency suited to the commercial mains. Conversion is typically done by using a switch mode DC/DC-converter followed by a conversion into AC. DE 199 19 766 A1 describes the use of parallelled DC/DC-converters that are electrically connected to the same DC/AC-inverter. In this way, all DC/DC-converters feed energy to a common DC-bus, and advantageously only one DC/AC-inverter is used. This design is centered about a central microprocessor solution of the power converter, which microprocessor controls the connected DC/DC converter. Due to this centralised control structure, the number of additional DC/DC converters is limited as is the possibility of simultaneously using DC/DC converters for different types of green power. The modules are not coordinated with each other and act as slaves with only limited control capability.

SUMMARY OF THE INVENTION

A first object of the invention is to enable independent control in each of the modules used in the system, hereby providing an easy form of controlling power switches used inside a power converter.

A second object of the invention is to provide a modularized power converter which exhibits an improved electrical efficiency compared to prior art.

These objects are met with a power converter according to the independent claim.

Advantageously, a system with distributed intelligence is achieved. As each module has its own controller and communicates via a bus, each module controls itself according to commands or information received from other modules. Thus, a high degree of load management and load distribution is possible. But also flexibility is achieved. Exchanging a photovoltaic DC/DC module with a fuel cell module is possible, because the controller on the module has all control strategies at hand. The same DC/AC-inverter can be used. Further, the inventive power converter has the advantage, that the DC-input from the green cell is decoupled from the output of the grid connected inverter. This means, that the green cell is not affected by the 100/120 Hz ripple caused by the fact, that the power is not constant on the output of a single phase inverter. When having an independent controller on the DC/DC-converter module, this controller can modulate the power switches to suppress ripple retroaction. The inventive design further has the advantage, that the placement of the transformer on the DC/DC module makes exchange of a fuel cell DC/DC-converter module with a solar cell DC/DC-converter module relatively inexpensive. If the transformer was placed on the DC/AC-inverter module, then this also had to be replaced.

Advantageously, the first module comprises a current sourced inverter and the second module a voltage sourced inverter. A current sourced inverter will reduce the ripple on the input of the DC/DC-converter because of the placing of a coil in the rail feeding energy to the switches. Actually the coil could have been inserted in the DC-bus on the DC/AC-inverter, but this would give more ripple on the current fed from the source. Therefore, a current sourced DC/DC-converter is preferred. Further, capacitors of lower ratings can be used on the input of the DC/DC-converter. The voltage sourced inverter on the second module is preferred because it enables an easy connection of multiple DC/DC modules to the DC/AC module.

Thus, selecting an interface between the first and the second module after the rectifier gives a well-defined point of connection for multiple DC/DC-converters to be connected to one and the same DC-bus in the inverter module.

If the first module uses a power module, an H-bridge of switches and a full bridge rectifier can be integrated into the same. housing of the power module.

This gives a high degree of integration and component density, which further enables the use of only one cooling module instead of two.

Preferably, two or more first modules are connected to the second module. This means that one can connect two solar cells, or one solar cell and one fuel cell to the same inverter and obtain either higher power input or redundancy in the supply of energy.

The use of independent controllers means that each DC/DC module is able to perform a suppression of ripple generated by the delivery of power to a single phase grid. This ripple acts back into the DC/DC-converter, but can be compensated in that an actual voltage amplitude of a ripple on the DC voltage of the second module, or an actual phase angle of a ripple on the power delivered to the grid, is measured and converted into a duty cycle compensation value which is added to a duty cycle of the switches of the first module. In this way, the ripple simply stays in the DC-bus capacitor of the DC/AC-inverter module. Information about the angle value or the voltage amplitude is transferred via the communication bus. The suppression of ripple improves the electrical efficiency of the power converter.

It is preferred, that the first and second controller are galvanically separated from each other. Hereby a total galvanic separation of the DC/DC-converter module and the DC/AC-inverter module is reached. The galvanically separated bus typically communicates via optocouplers.

A man-machine interface module can be connected to the serial communication bus, and be used for parametrisation of the power converter.

A snubber circuit can be connected in front of the inverter of the DC/DC-module. Using a passive snubber for preventing the power switches against overvoltages from the transformer is a well known measure, but by feeding back the energy to the DC-input of the DC/DC-converter the overall efficiency of the power converter is increased.

Advantageously, an active snubber is used. Connecting a switch to a snubber capacitor allows the first controller to control the flow of energy, which has the advantage that a further raise in the efficiency is obtained.

The electrical efficiency of the DC/DC-converter is increased, if the voltage across said snubber capacitor is a function of the voltage supplied from the green power unit. The first controller calculates a voltage set point from the green power unit voltage and the switch is modulated to induce a voltage across the capacitor which voltage corresponds to the voltage set point.

The DC/DC-converter is preferably started in a discontinuous current mode during which a duty cycle is increased by a duty cycle generator until a limit value is reached, whereafter the DC/DC-converter is operated on this limit value for a time period. This softstart enables the use of a solar cell also at sun rise or at sun set, because the solar cell normally will collapse if the DC/DC-converter is allowed to draw more current from the cell than it is able to deliver. To avoid collapse, the DC/DC-converter is driven at exactly the limit value which matches the lower current which the solar cell can provide at sun rise and sun set.

An H-bridge of switches in the DC/DC-converter is preferred if the green power unit supplies a higher voltage which is the case for a solar cell. Thus there is no need for high voltage ratings of the power switches in the H-bridge, and the transformer can be designed smaller.

A current sensor, preferably a shunt, is inserted in the minus conductor of the inverters in the DC/DC-converter and the DC/AC-inverters respectively, and the current signals are led to the first and second controller respectively. Hereby only one shunt is used per inverter as opposed to solutions where the shunt is inserted in each leg of the lower switches.

Instead of an H-bridge, the DC/DC-converter can be designed with a push pull stage. Push pull converters are preferred if the green power unit supplies low voltage, which is e.g. the case with fuel cells.

The push pull stage of the DC/DC-converter is preferably started in a discontinuous current mode during which a duty cycle is increased by a duty cycle generator until a limit value is reached, whereafter the DC/DC-converter enters a continuous current mode in which the duty cycle generator freely generates the duty cycle to regulate the current in the DC/DC-converter. Hereby, the power converter can be started without large inrush currents. The value of the duty cycle is forcingly raised slowly during a first period, and varying freely during a second period. Thus, the inrush current is reduced in the discontinuous mode of the converter.

Preferably, the limit value is a minimum simultaneous conduction time or minimum overlap in duty cycle of the switches in the DC/DC-converter.

More preferably, after reaching the limit value the duty cycle controller keeps the duty cycle approximately constant at a minimum overlap for a period of time during a transition zone between the discontinuous current mode and the continuous current mode.

When using a push pull converter, an optimum working point of the green power unit can be reached with a search method which is characterized in that a current reference for the current of the DC-coil of the push pull converter is regulated stepwise until an optimum operating voltage of the green power unit is reached. The optimum operating voltage gives the highest output power.

The inverter of the second module is preferably controlled to emulate an ohmic resistor towards the grid. This gives low harmonic distortion. This type of control is implemented with the second controller controlling the inverter of the second module by means of two control loops, a current control loop regulating the shape of current supplied to the grid similar to the shape of the grid voltage, and a voltage control loop regulating the amplitude of the current supplied to the grid.

Preferably, the first controller is connected to minus of the DC/DC-converter, and the second controller is connected to minus of the DC/AC-inverter. This simplifies the gate drives, and no extra power supplies and optoisolators are needed.

An LCL filter is inserted between the output of the second module and the grid. This filter smoothes the current and voltage delivered to the grid. Oscillations may occur, but these can be dampened by adding an ohmic resistor in parallel with the coil next to the grid.

BRIEF DESCRIPTION OF THE DRAWINGS

The invention will now be explained in details by means of the Figures, where.

DETAILED DESCRIPTION OF THE PREFERRED EMBODIMENTS

Figure 1:
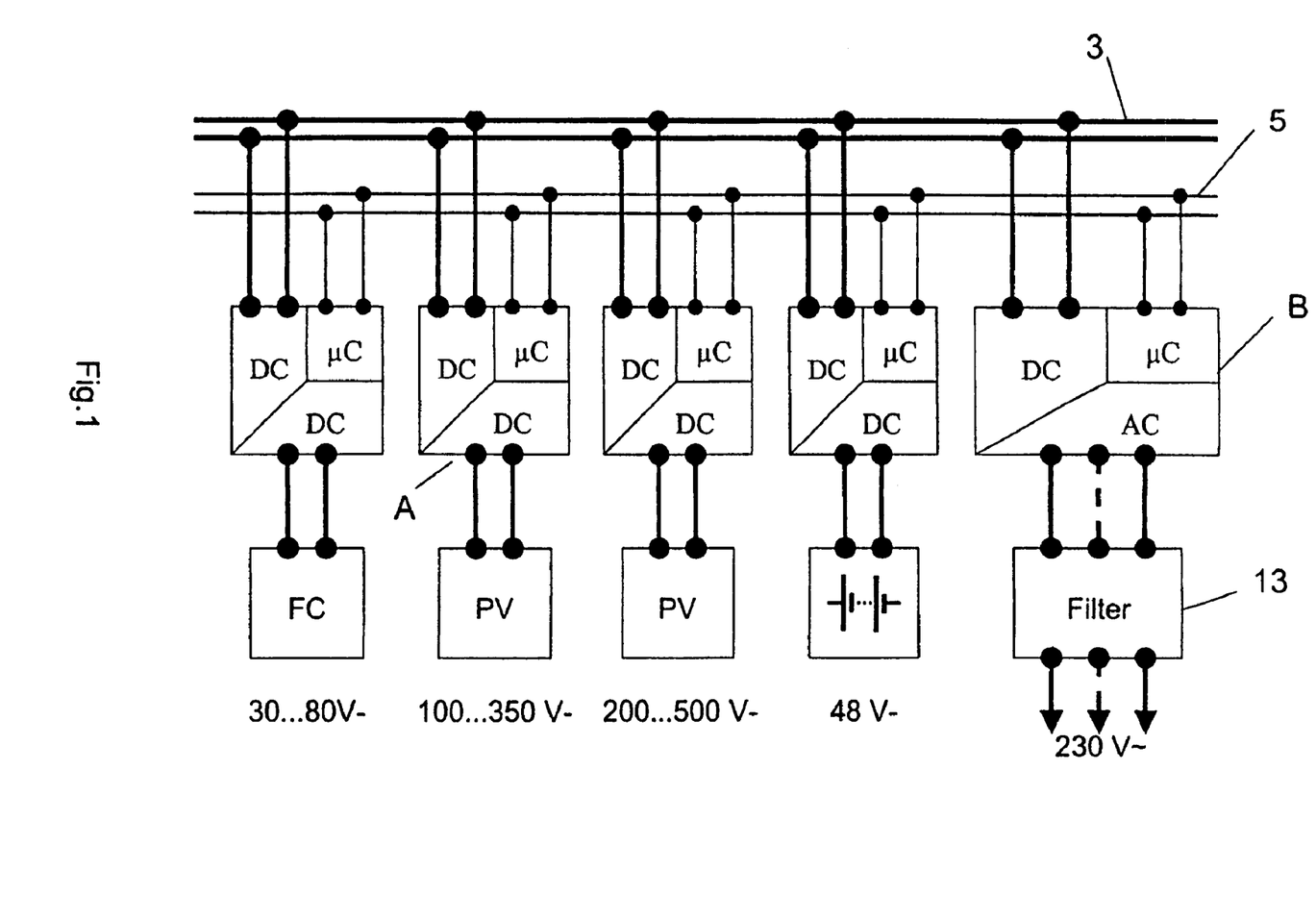
FIG. 1 shows paralleled DC/DC modules and one DC/AC module according to the invention connected to a common DC-bus.
Figure 2:
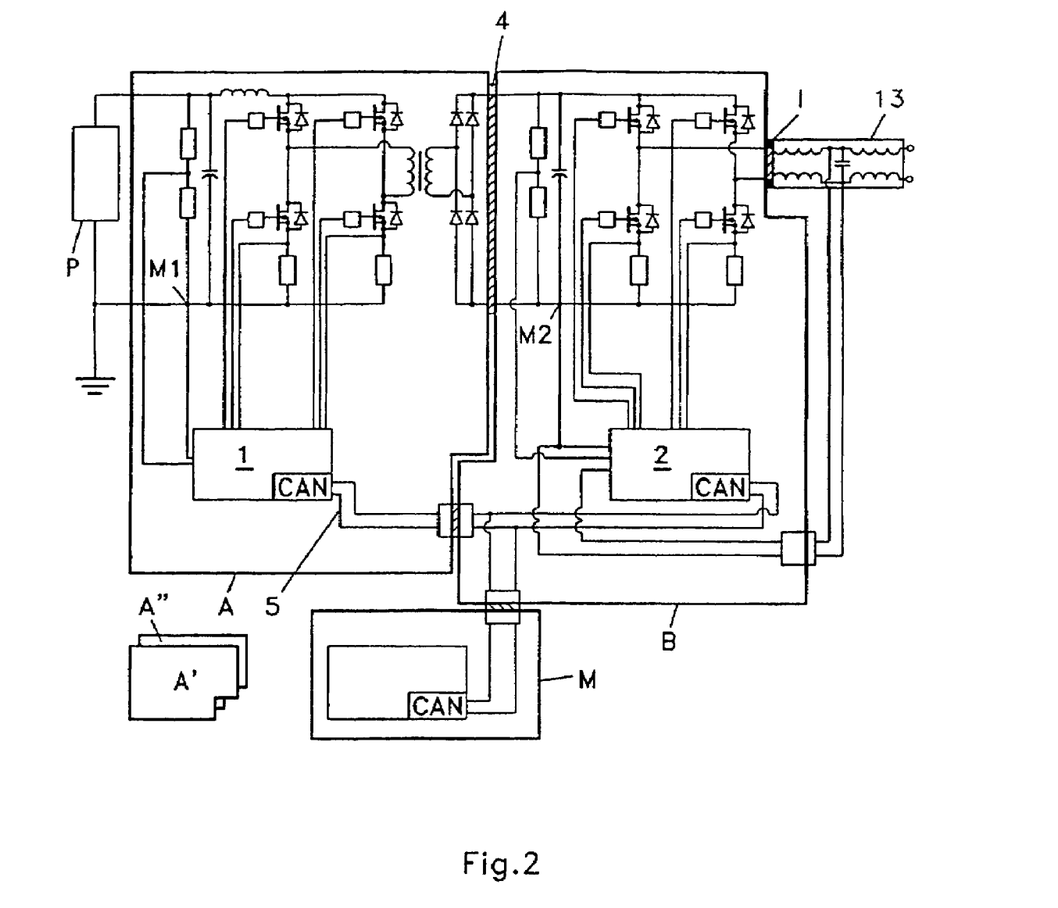
FIG. 2 shows a modularized power converter according to the invention with an H-bridge DC/DC-converter.

FIG. 1 shows how a DC/DC-module A is connected to a DC-bus 3, which is common to several other DC/DC-converters. They are all feeding energy into the DC-bus, and DC/AC-inverter B taps the DC-bus and converts the energy into a grid voltage and grid frequency. A filter 13 as described later in this application may be used. Such filter is also a module, as shown in FIG. 2. The modules A and B are connected to each other via an interface 4 shown on FIG. 2. Such interface is preferably an easy insertion interface. The modules communicate via a serial bus 5. The CAN bus is preferred. The control of the system consisting of modules A and B is divided into two control circuits 1 and 2 galvanically isolated from each other. In this embodiment, a micro controller regulates the DC/DC-converter, and a Digital Signal Processor regulates the DC/AC-inverter. The DC/DC-converter and controller are placed on a first module A and AC/DC-inverter and controller are placed on a second module B. In this way, a modularized system is achieved, which makes customisation easy. Thus, in the case where the energy cell is not a photovoltaic cell but a fuel cell, module A is replaced by module A' or A" comprising a control and a DC/DC-converter suited for a fuel cell, which supplies a lower voltage than the photovoltaic cell. Or, alternatively, the inverter module B can be replaced. Also, the Man-Machine Interface M is an intelligent module with communication capability.

In summary, by dividing the green power converter into modules comprising a DC/DC-converter and a DC/AC-inverter module respectively, and adding control intelligence to each module, the possibility of a modular system is opened. The converter and the inverter can be designed separately, and altering the DC/DC-converter topology can be done without changing the inverter topology. Thus, the green power converter is flexible on system level as well as on a converter technology level.

Continuing on FIG. 2, the DC/DC-converter controller 1 is connected to minus Ml of the converter, i.e. to minus of the green cell P. This simplifies the gate drives and no extra power supplies and optoisolators are needed. Current measurement may be made with a resistor RM1 inserted serially in the power leg, but a shunt in the minus is preferred. Further, input reference signals from the outside world will advantageously be on low potential.

Also, the inverter controller 2 is connected to minus M2 of the DC/AC-inverter. This simplifies gatedrives and supply for these, since bootstrap supply based gatedrive IC's can be used. Since the inverter voltage loop always operates at fixed voltage reference (375 V) an external reference is not needed for this subcircuit. Startup or shut-down signals between the two circuits, i.e. the first and the second controller, may easily be transferred via inexpensive optocouplers. This can be done by means of the serial bus.

The modular concept enables the distribution of intelligence. Instead of having one master controlling all modules, each module A, A', A", B or M has its own controller and communication interface. While module A is designed for photovoltaic, module A' and A" may be designed for fuel cells. A, A' and A" can at the same time be connected to inverter module B.

Different topologies can be used in the power converter, where it must be observed that the high frequency ripple of the green power cell current should be small and that the cost should be minimized.

As mentioned, the power converter should provide galvanic isolation between the green cell terminals and the utility grid. If the green cell is a fuel cell, it operates in the voltage range 25-45 VDC. Having a grid voltage of 230 Vrms, the power converter must perform two tasks: the power must be inverted and the voltage must be amplified. These tasks could either be done by connecting an inverter to the fuel cell followed by a 50 Hz transformer (AC-AC voltage gain) or by connecting a switch mode DC/DC-converter to the fuel cell (DC/DC voltage gain) followed by a grid connected DC/AC-inverter. A DC/DC voltage gain (switch mode DC/DC-converter) is preferred in order to limit physical size and the cost of the system. Hence, a system with a switch mode DC/DC-converter followed by a grid connected DC/AC-inverter is selected. Using a grid connected DC/AC-inverter makes the power converter system more modular as the DC/DC-converter can be replaced according to the application and a standard inverter system can be employed. Basically, the DC/DC-converter can be a current sourced or a voltage sourced converter. A current sourced DC/DC-converter requires less input filtering in order to minimize the high frequency current ripple drawn by the power converter because an inductor is placed at the input. Thus, a current sourced DC/DC-converter is preferred. The two most attractive DC/DC-converter topologies are the the full-bridge converter and the push pull converter. Both topologies exhibit a high efficiency capability. They are well known technologies and have a good utillisation of the magnetics (bidirectional magnetization of the transformer) and of the power switches. Both will be detailed later.

The three most attractive single phase DC/AC-inverter topologies are the full-bridge inverter, the half-bridge inverter and the push-pull inverter. A standard H-bridge inverter is preferred due to the good utilization of the materials and a high efficiency capability.

In the following, a current sourced full bridge DC/DC-converter with a full bridge DC/AC-inverter will be described with reference to FIG. 3.

The fundamental operation of the dual full bridge topology is the following: the voltage delivered by the fuel cell 15 is inverted into a high frequency voltage in the first DC/AC-inverter 18. This voltage is fed into a high frequency transformer 10. The transformer secondary is connected to a rectifier 8 with a filter capacitor 9, and thereby a DC/DC-converter is achieved. The voltage delivered by the DC/DC-converter is fed into the DC/AC-inverter 14, whose main task is to generate a sinusoidal grid current. The DC/DC-converter is controlled in such a way, that the current delivered by the fuel cell is constant at the desired value. This may cause the voltage of the DC-link between the rectifier and DC/AC-inverter to rise beyond a certain limit. Therefore, the DC/AC-inverter 14 is controlled to lower the DC-link voltage, meanwhile it also generates the grid current. This means that the reference for the peak grid current is dictated by the maximum DC-link voltage.

The advantage of such two-stage inverters is that the energy storage capacitors may be reduced in size when compared with the single step topologies. It may also be easier to obtain a controller for these inverters, because they are decoupled by the energy storage. Moreover, a high frequency transformer 10 is used, which is much smaller than a 50 Hz transformer, for galvanic isolation and stepping up the fuel cell voltage.

Figure 3:
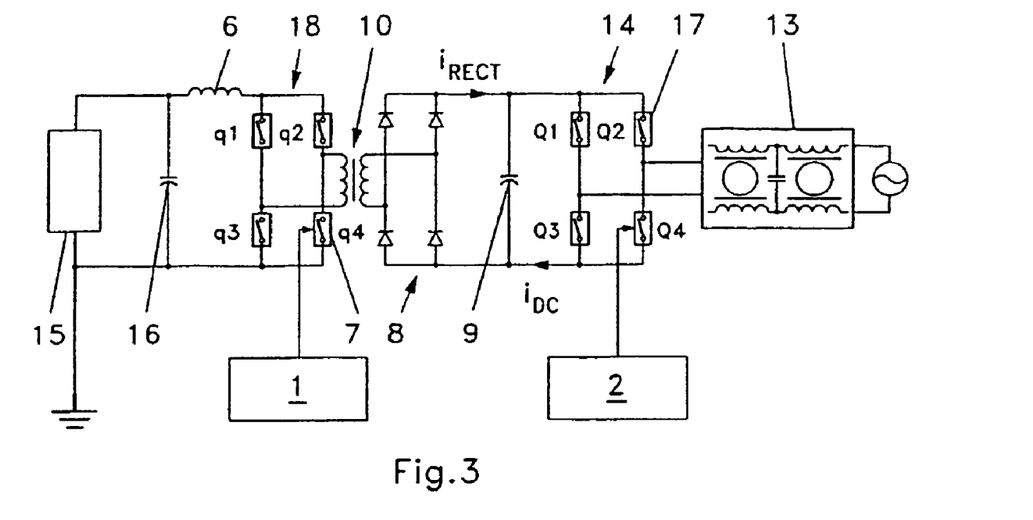
FIG. 3 is a diagram according to the invention of a grid connected DC/AC inverter with a full bridge DC/DC-converter.

The full bridge current source—full bridge voltage source power converter of FIG. 3 is used in the low power region. A major advantage is that the converter is based on the principle of boost operation, which means that it is possible to step up the voltage without the transformer. Another advantage is that the diodes in the rectifier are commutated by a current, and no reverse recovery currents are therefore generated. Probably the only disadvantage associated with this converter is the inherent presence of voltage spikes across the switches. These spikes originate from the transformer current and leakage inductance. In practice, the leakage inductance may be held small by making a proper transformer design, but not small enough in order to be able to omit a snubber.

Figure 4:
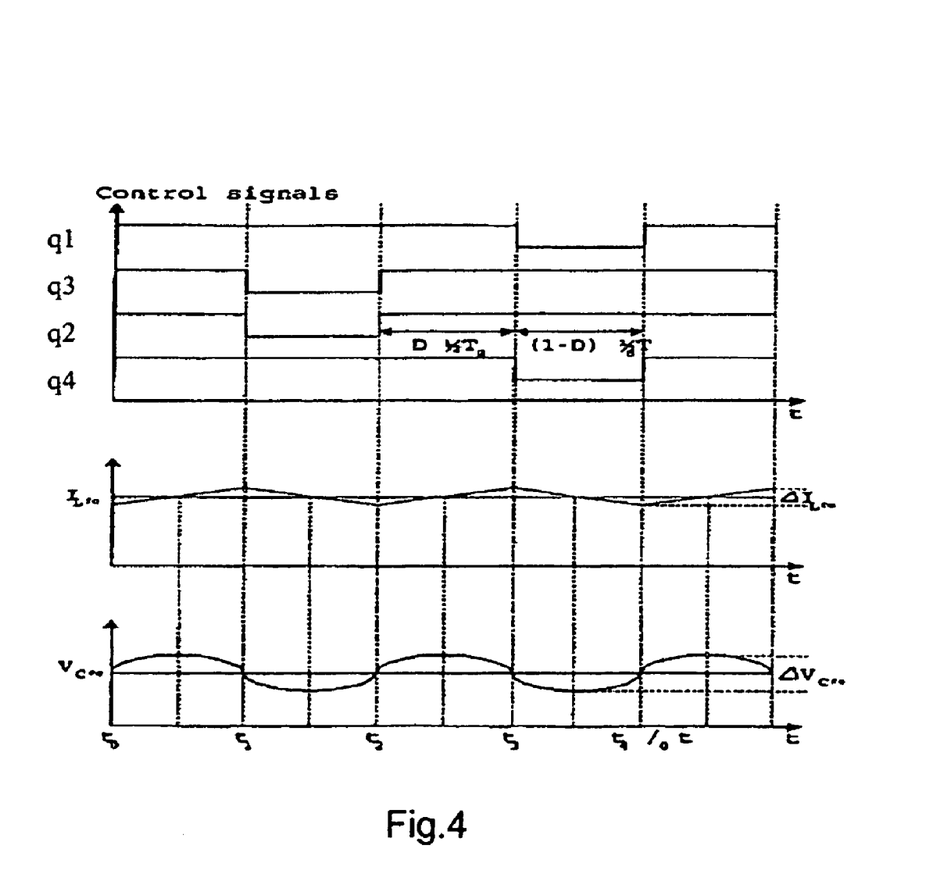
FIG. 4 shows the waveforms of the circuit in FIG. 3.

FIG. 4 shows the control signals and the waveforms of the DC/DC-converter:

[t0-t1] All four switches ($q_1$-$q_4$) are closed, causing the current $i_{LFC}$ through inductor 6 to rise linearly by means of the cell voltage. The cell voltage is clamped by the input capacitor 16, so only a small amount of ripple is present. The output is supplied by the stored energy in capacitor 9.

[t1-t2] The transistors $q_3$ and $q_2$ turn off at time t1. The current stored in the input inductor 6 is then forced through the transformer 10, and the inductor is discharged by means of the cell voltage and the reflected DC-link voltage. The transformer current $i_a$ is negative, and feeds the output capacitor 9 through the rectifier 8.

[t2-t3] Transistors $q_3$ and $q_2$ turn on again at time t2, and the input inductor is charged again.

[t3-t4] $q_3$ and $q_4$ turn off, and the transformer current is now positive.

The voltage spike across the switches 7 may be determined in terms of their output capacitances $C_{oss}$ and the leakage inductance. The spike amplitude may be decomposed into two terms, one from the reflecting DC-link voltage, and the other from the voltage generated by the leakage inductance. The current delivered by the leakage inductance is poorly damped, and reaches a peak value of two times the fuel cell inductor current.

In order to reduce the turn-off voltage spikes over the switches, it is necessary to reduce the transformer leakage inductance. If this not is possible, a snubber circuit must be added in parallel with the DC-link.

Supplying power to the a single-phase grid gives 100 Hz or 120 Hz pulsations on the output of the power converter. The pulsations act back into the DC/AC-module, and causes ripple. This ripple is also reflected back to the input and hence the operating point moves away from the optimum cell voltage. This lowers the overall efficiency of the power converter. However, this can be compensated by measuring the actual phase value of the power delivered to the grid, converting the phase value into a duty cycle compensation value, and adding this compensation value to the normal regulation duty cycle. An upward going motion on the power curve on the grid is counteracted by inducing a positive going motion in the voltage delivered by the fuel cell. The duty cycle compensation value is a feed forward contribution which can be negative or positive, and is calculated by controller 1. Instead of measuring the power, measurement of the actual phase value of the grid voltage or the actual voltage value of the ripple in the DC-link is possible.

Figure 5:
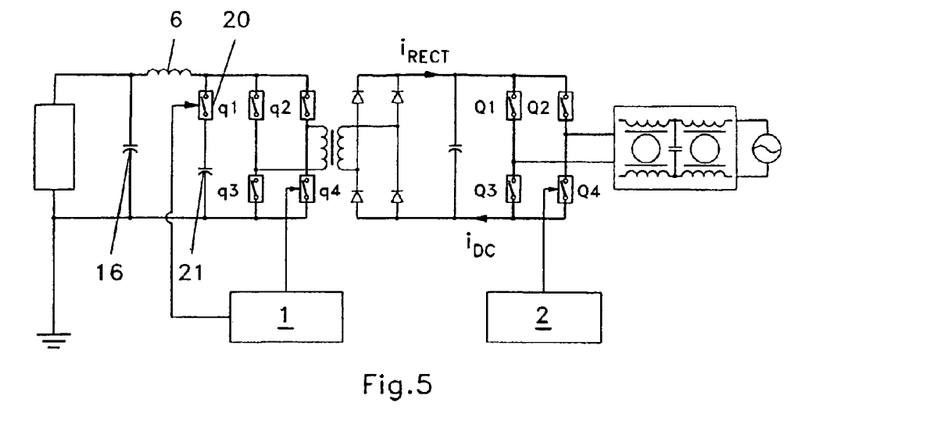
FIG. 5 is an elaboration of FIG. 3, now incorporating an active clamp in the DC/DC module.
Figure 6:
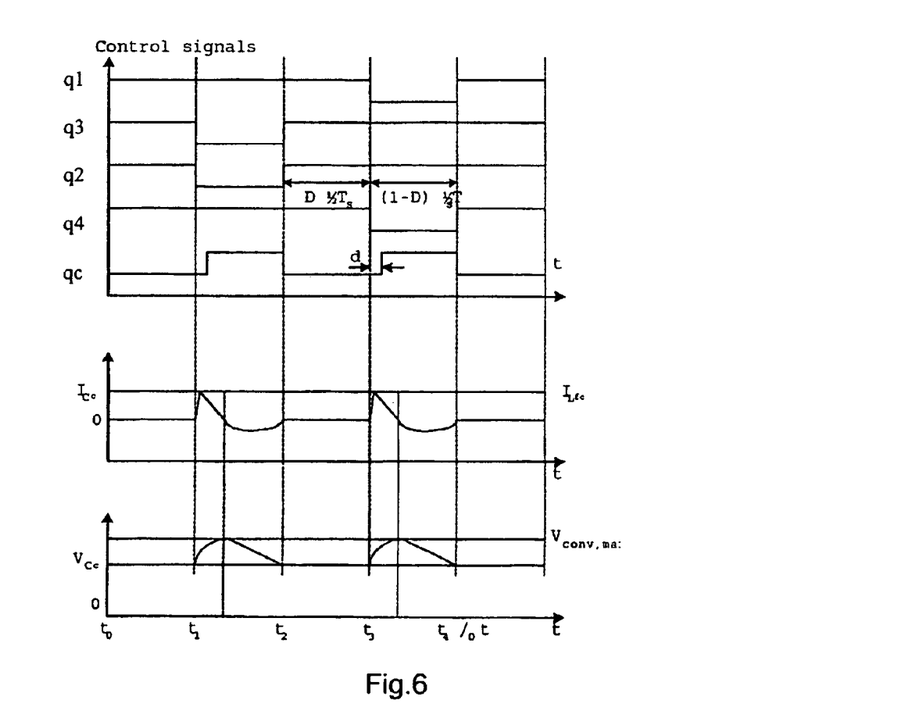
FIG. 6 shows the waveforms of the circuit in FIG. 5.

An active clamped current source—voltage source converter is depicted in FIG. 5, and the key waveforms in FIG. 6. This active clamp is a good compromise between complexity, reliability and efficiency. The advantage of this topology is that a passive snubber is replaced with an active one, which increases the overall effciency when compared with the converter of FIG. 3. The active clamp consists of a switch 20 and a snubber capacitor 21, and is switching on during zero current in the inductor 6, and therefore only turn off losses may appear together with the forward voltage drop of the switch.

The mode of operation is shown in FIG. 6:

[t0-t1] As in the CS-VS converter.

[t1-t2] When transistors $q_3$ and $q_2$ turn off, the leakage current is discharged into the snubber capacitor 21 through the internal body diode of the snubber switch 20. This causes the voltage across the switches to raise slowly. The snubber switch 20 ($q_C$) is then turned on before the snubber current becomes negative, and zero current switching is in this way achieved. The capacitor current is now negative, causing the voltage to drop toward the reflected voltage from the DC-link.

[t2-t3] As in the CS-VS converter.

[t3-t4] $q_1$ and $q_4$ turns off.

The ripple current in coil 6 and the ripple voltage across capacitor 16 is equal to the ones given for the CS-VS converter.

Starting the H-bridge is alleviated by the snubber, which enables the controller 1 to keep the input current from the fuel cell at a low value during e.g. low capacity in the fuel cell. Hereby, the cell is protected against overload.

Figure 7:
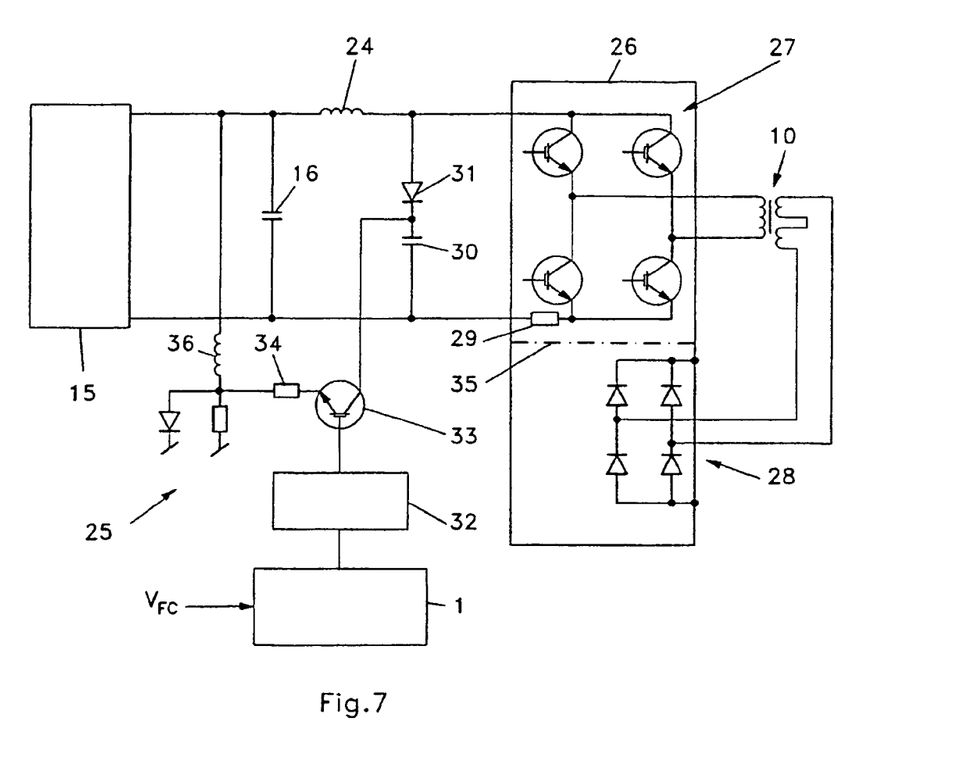
FIG. 7 is a diagram of a full bridge DC/DC-converter with an active snubber circuit.

FIG. 7 illustrates a current fed DC/DC-converter provided with an active snubber circuit 25. The DC/DC-converter comprises a power module 26, which incorporates the inverter bridge 27, the rectifier 28 and a shunt 29. Thus inverter and rectifier are integrated into the same housing. In order to obtain a fully galvanic isolation between rectifier and inverter inside the power module 26, a separating channel 35 is built into the power module. This channel has a width of 3 mm. The controller 1 controls the snubber circuit 25 and inverter 27, but details about control of the latter is omitted here. The snubber circuit consist of a snubber capacitor 30, which through diode 31 stores energy delivered from transients generated by switchings of the inverter. The stored energy is fed to the input of the DC/DC-converter, hereby raising the efficiency. Controller 1 pulse width modulates through galvanically isolated driver 32 switch 33 to draw current from capacitor 30 through resistor 34 and snubber coil 36. A voltage set point of the snubber capacitor 30 is calculated by the controller 1 on the basis of the voltage of the fuel cell inputted to the controller, and the controller modulates switch 33 to obtain a voltage across capacitor 30 which corresponds to said voltage set point. The calculated voltage set point maximises the efficiency of the DC/DC-converter, and the set point is preferably kept constant for a fuel cell voltage between 0-50V, and raised to 70V for cell voltages above 50V. The set point can also be calculated as a function of the fuel cell current or the DC-link voltage of the second module, but in general the set point voltage must be higher than the maximum voltage from the fuel cell. Because of the high frequency PWM switching, the snubber coil 36 can be limited in size and still reduce the ripple of the current fed to the input. Thus, the amount of snubber energy fed back to the DC-input is controllable.

Figure 8:
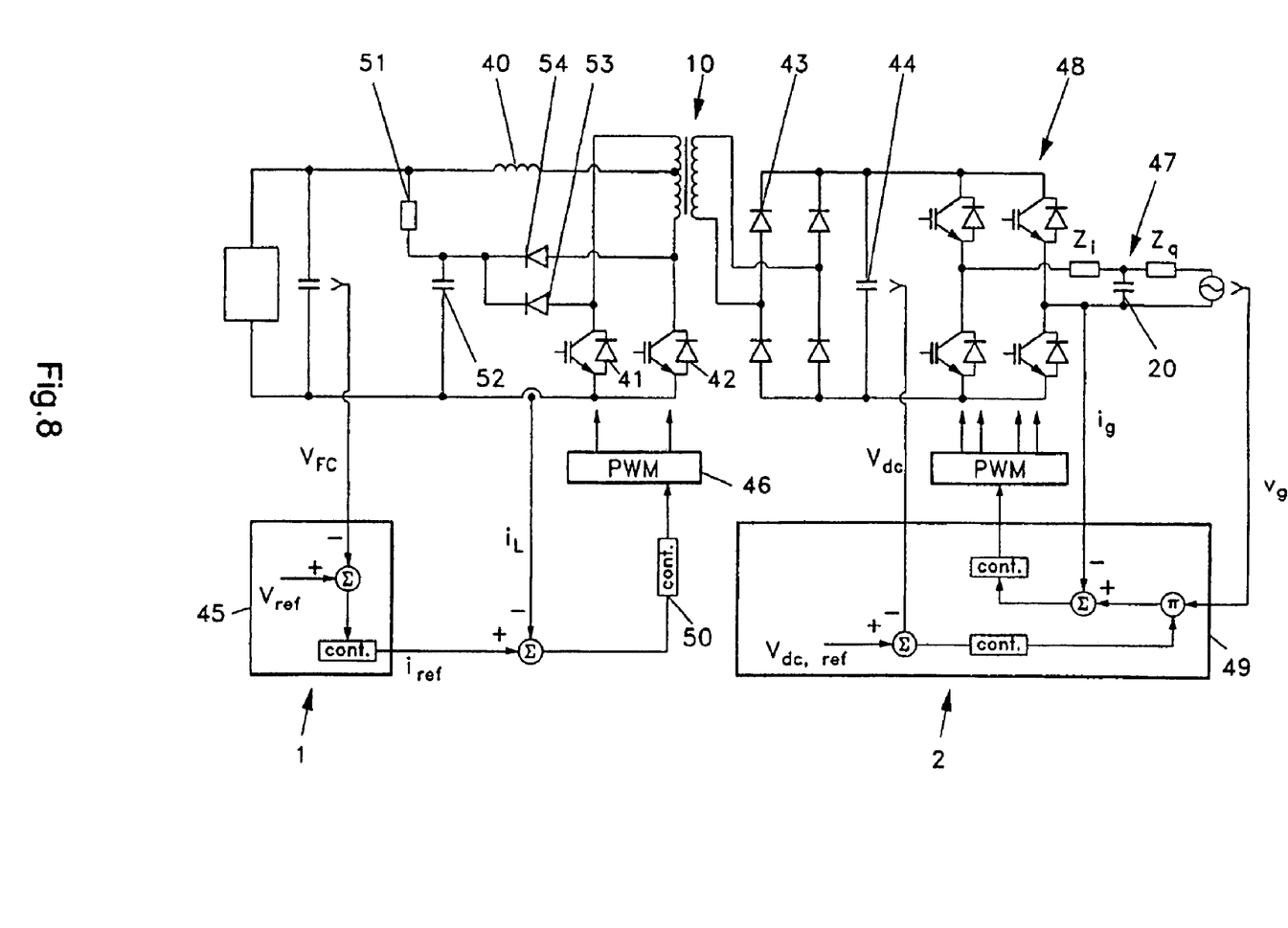
FIG. 8 is a diagram according to the invention of a grid connected inverter with a push-pull DC/DC-converter.

FIG. 8 shows a power converter which instead of the full bridge inverter in the DC/DC-converter uses a current-fed push-pull DC/DC-converter, which is basically an isolated boost converter consisting of DC-coil 40, power switch 42, diode 43 and capacitor 44. The steady state voltage transfer function for continuous conduction mode is:

$$V_{DC} = \frac{n}{1 - D_L} \cdot V_{FC} \qquad (1)$$

where $D_L$ is the duty cycle seen from the inductor, n is the turns ratio on the transformer 10, $V_{FC}$ is the voltage from the fuel cell and $V_{DC}$ the DC bus voltage. Through inspection of the current waveforms and on/off-times of the power switches, the following coherence between inductor duty cycle $D_L$ and switch duty cycle $D_q$ can be established:

$$D_q = \frac{D_L + 1}{2} \qquad (2)$$

Figure 9:
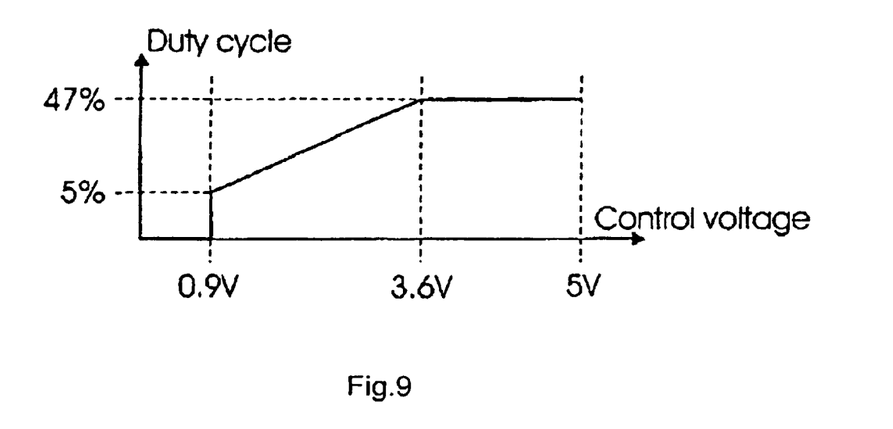
FIG. 9 shows the transfer characteristic of an analog PWM generator used in the push-pull DC/DC-converter.

It appears that the frequency seen from the inductor is twice the switching frequency of the power switches (i.e. $f_L = 2f_q$). Keeping the duty cycle $D \geq 0.5$ means current mode operation. In this embodiment the controller 1 comprises a microprocessor 1 and a PWM modulator (of the type SG3525) 46. This modulator is not ideal and an offset in the inductor (overlapping) duty cycle is present in the system which can be seen from FIG. 9. The PWM modulator chip 46 is designed for driving the two transistors 41,42 in push-pull configuration. The span of the control voltage is given in the design catalog 0-5V, but continuous variation of the duty cycle is provided only between 0.9 V-3.6V. From 3.3 V to 5V, the duty cycle remains unchanged (about 47%), while below 0.9 V, the duty cycle of the pulses changes suddenly from about 5% to zero (no pulses). The input to the PWM modulator is the control voltage that gives a duty cycle according to FIG. 9. Thus, the minimum inductor duty cycle is 5%. This gives rise to a high startup current which may trigger the over-current protection and the system can therefore be difficult to start. Due to the duty cycle offset a smooth startup procedure has been developed. The PWM modulator chip 46 is designed to drive voltage mode push pull converters. Initially the converter is started in voltage mode (D<0.5) and the switch duty cycle is ramped up from zero to one half. When the switch duty cycle reaches 0.5 the microprocessor is allowed to operate. When the push-pull converter operates in voltage mode, the microprocessor provides gate signals to the MOSFETs 41, 42, and when the push-pull converter operates in current mode the PWM modulator 46 provides the gate signals. The microprocessor dictates the operating mode of the push-pull converter a 'select pulses' signal (FIG. 10) is used to select the source of the gate signals. In addition, a 'force minimum PWM ref' (FIG. 10) is used to force the PWM reference of the analog control to be minimal during the transition from voltage mode to current mode. When the push-pull converter has entered current mode operation the analog control IC is released. In the following, the push-pull controller will be further elaborated.

The control of the push pull converter uses an analog PI controller to deliver a command signal to the dedicated dual PWM generator 46. In conjunction to this analog control, a logic control unit implemented in a Programmable Logic Device (PLD, not shown) is employed in order to provide the necessary protections and to improve the flexibility, such as the controlled soft start-up of the converter in voltage mode, driven by the micro processor.

The control system for the push pull converter has the following requirements:
to accept reference signal from the microprocessor
to include a PI controller for the inductor current
to convert the output signal from the PI current controller into pulses for the push pull transistors
to include auxiliary circuits to provide soft start-up of the converter, antiwindup In order to avoid over currents during start-up, caused by the unmagnetized transformer 10 or the saturation of the analog PI controller which may cause overshooting of the control signal, auxiliary circuits should be used. These consist of:
an anti-windup circuit on both upper (4.7 V) and lower (0.9 V) limit of the PI controller output, which gives the possibility to have continuous pulse generation.
a controllable minimum switch overlap duty cycle circuit, which gives the possibility to force the push-pull converter to work with minimum switch overlap duty cycle, meaning minimum power in DC-link, commanded from the microprocessor when needed;
extra functional logic found in the PLD, to allow direct command of the push-pull transistors from the microprocessor when needed.
few digital outputs from the microprocessor controlled by software.

All these subcircuits form a hybrid regulator (analog& digital), able to react very fast (characteristic for analog control) in order to control the current in the inductor 40, and also providing flexibility (characteristic for digital control) in order to solve easily all the required tasks needed by the inventive power converter.

As mentioned, in order to be able to start-up the push-pull converter without overcurrents, it is necessary to ramp-up the duty cycle in voltage mode from zero duty cycle to 50% and beyond, when this goes in current mode, until it reaches the minimum limit of the switch overlap duty cycle given by the analog modulator. In this way, any shock is eliminated. However, due to the presence of the inductance in the circuit, during voltage mode much energy is produced which flows into a snubber circuit. Therefore, this ramping should be completed fast, and it should be verified that the snubber circuit is able to withstand the transient without exceeding the safe operation voltage level.

Figure 11:
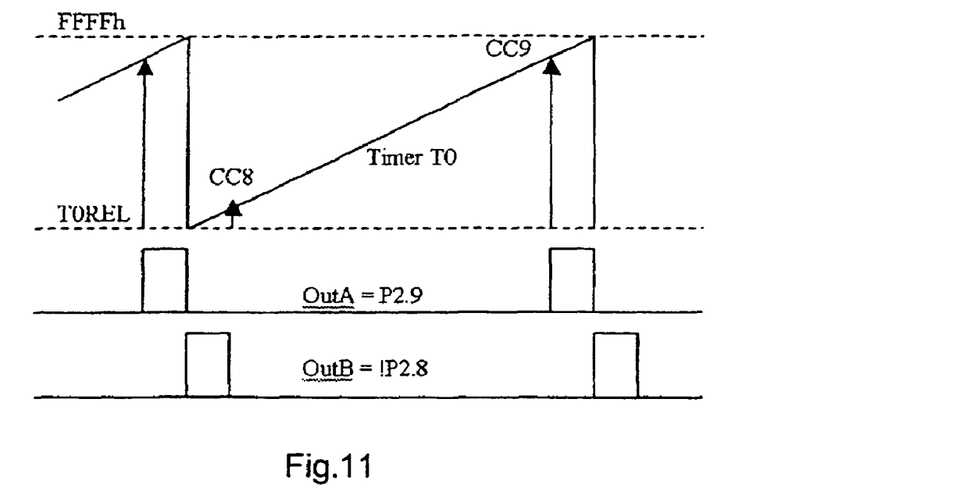
FIG. 11 illustrates the pulse sequence generated by a microprocessor in voltage mode of the push pull converter.

Investigations to implement the above start-up principle exclusively by analog circuitry gave no result, therefore It has been chosen to let the microprocessor produce the two desired controllable duty cycle 180° shifted pulses, by using two digital outputs driven by a capture-compare unit. To be able to control directly the gate driver by these signals, another signal to select the source (analog PWM-modulator or microprocessor) should be used. In FIG. 11 the principle of generation of the pulses is shown.

Timer T0 is running continuously with a frequency very close to the analog PWM generator. Digital outputs P2.8 and P2.9 are programmed to work in a mode, which is commanded by compare registers CC8 and CC9 in the microprocessor, which are both assigned to timer T0. The pulses are not equally placed because of software simplicity, but also, because it is possible to reduce the energy which flows in the snubber circuit when one firing pulse is immediately following a previous firing pulse in the push pull converter. Also, it is easy to overlap the pulses, by making CC9 smaller than CC8, and performing smoothly the transition from voltage mode to current mode. In order to eliminate overshoots of the analog control, when the converter is started, or when the command is switched back to the analog PWM modulator, a circuit to force the Pi controller output, being controlled from the microprocessor by a digital output, is necessary.

This circuit should force the output of the PI controller to be higher than 3.6V, which corresponds to the minimum switch overlap duty cycle when commanded from microprocessor, and to ensure a smooth transition to steady state when command is released.

Figure 10:
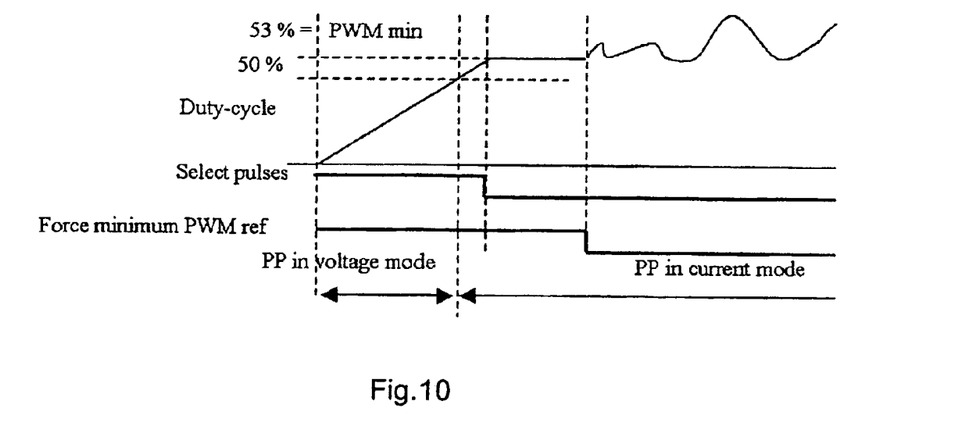
FIG. 10 shows the relation between duty cycle and current and voltage mode in the push-pull converter.

In FIG. 10 the evolution of the control signals during the start-up is shown. The converter starts driven by pulses produced by the microprocessor, with a variable duty cycle, ramping to a value, which corresponds to the minimum switch overlapping duty cycle, specific to the analog controller. Therefore, at the end of the ramping, the converter goes smoothly from voltage mode to current mode. All this time, the output of the PI controller is clamped to a value, which applied to the PWM generator, produces the same duty cycle synthesized by the microprocessor at the end of the ramp. Therefore, when the source of the pulses is switched from microprocessor to the analog PWM generator, no transient should appear. Only after the output of the PI controller is softly released, the duty cycle of the switches may vary freely, in order to regulate the inductor current at the desired level.

Practical tests on the start up procedure have shown, that though an inrush current is still present, it is reduced and far below the over current protection limit, so a smooth startup is achieved.

The transformer 10 in FIG. 8 is the key component when designing the current fed push-pull DC/DC-converter due to the demand for a high efficiency. A high efficiency demands for a good magnetic coupling between the two primary windings in order to decrease the power dissipated in a snubber circuit. The primary windings are the most important part in the transformer design due to the high coupling requirement and the high current through these windings. Different types of magnetic designs were tested and a transformer with copper foil for the primary windings gave the best coupling between the two primary windings. This solution also gave the best efficiency since the foil windings provided a good utilization of the winding area and thereby allowing a lower current density in the transformer.

From FIG. 8 it is seen, that a single phase H-bridge inverter 48 is used as DC/AC-inverter, and an LCL filter 47 is placed at the output in order to achieve a high filtering of the inverter output current. The aim of the inverter control is to load the DC-link capacitor 44 in order to maintain the average of the DC-link voltage at the desired value $V_{DC,ref}$. The current impressed into the utility grid must comply with IEC-61000-3-2. In addition, the inverter must be fast enough to protect the DC-link and the semiconductors from over-voltages due to spikes from the power source. In order to fulfill the low harmonic regulation IEC 61000-3-2, the inverter is controlled to emulate a resistor $R_e$. Hence, the grid current waveform must be a scalar of the voltage waveform: $R_e = v_g/i_g$. The control is done digitally.

Besides the harmonic content of the line current, two performance indexes axe used: % $THD_I$ and PF. With perfect resistor emulation and with a background distorted line voltage, the line current % $THD_I$ will be the same as the line voltage distortion % $THD_V$. The power factor will be unity for perfect resistor emulation and regardless of background distortion.

In order to obtain a high power factor and a low % $THD_I$ the current controller must be able to track not only the fundamental grid frequency at 50 Hz but also the distortion components. The switching frequency and the sampling frequency is 10 kHz.

The inverter control consists of two control loops. The inner control loop shapes the grid current to a wave shape proportional to the grid voltage. The outer control loop controls the amplitude of the grid current in order to maintain the average of the DC-voltage equal to the reference.

Hence, the inverter emulates a resistance by means of two cascaded loops. The grid and the inductor current are not sinusoidal because the DC-link voltage control loop distorts the current reference, which the current controller follows (cf. the multiplier in FIG. 8). For that reason, the sampling time of the DC-link voltage controller should be equal to 20 ms. In this way, the DC-current injection to the grid is reduced to a minimum. It has been found, that a feed forward of the grid voltage cancels the influence from the grid voltage (at low frequencies). However, the feed-forward loop has less attennuation at higher frequencies and is thus not immune towards high frequency noise. Therefore a low-pass filtering of the feed forward loop should be used in order to avoid noise problems. Design of the current controller is done based on the third order LCL transfer functions given with the LCL filter yet to be described.

By using two loops, it becomes in this way possible to attach more than one power source to the same inverter-stage.

As demonstrated in the previous section, the current controller controls the wave shape of the line current. The DC-link voltage is controlled by varying the amplitude of the grid current $i_g$. The DC-link voltage must be maintained on a level above the peak of the line voltage in order to be able to maintain controllability of the inverter. Regarding the bandwidth of the voltage controller there is a trade off between grid current reference distortion and DC-link overvoltage protection: The grid current reference is basically formed as the DC-link current reference multiplied by the measured grid voltage which means that the grid current reference will only be a scalar replica of the grid voltage in the case of a constant DC-link current reference. This requires a very slow DC-link control. In terms of DC voltage protection the dc voltage controller must be fast enough to avoid hazardous operation. Actually hazardous operation will not be reached due to the hardware protection, but the DC-link controller must be fast enough to avoid triggering the hardware protection which shuts down the system (The maximum DC-link voltage allowed by the hardware is 420 V). Setting again the damping ratio to $\xi = 1/\sqrt{2}$ and taking the slow dynamic operational requirements from the fuel cell system into account the bandwidth of the voltage controller can be chosen very low around $f_{b,dc}$=2-5 Hz.

The dynamics of the current loop can be neglected during design of the voltage controller since the current loop bandwidth is app. 250 times higher than the outer voltage loop bandwidth. In addition the push-pull current control bandwidth is also much higher than the voltage controller bandwidth. For perfect resistor emulation and with sinusoidal grid voltage the power balance gives:

$$i_{dc,tg} = \frac{\hat{i}_g \hat{v}_g}{2 v_{dc,tg}} \quad (6)$$

Thus in steady state there is a simple relation between $i_{DC}$ and $i_g$. A PI controller is selected in order to achieve a DC voltage error at zero and to have a more smooth DC current reference less sensitive to noise.

The amplitude of the line current or the value of the emulated resistance is controlled by the outer voltages loop. Since the line current-in the ideal case-is sinusoidal, the power delivered to the grid is a pulsating power at twice the line frequency and the power ripple is 100%.

Referring again to FIG. 8, the areas enclosed by the hatched lines are implemented in two microprocessors 45,49 and hence, the control of the system is a mixture of digital and analog control. The fuel cell provides a reference for the fuel cell voltage $V_{ref}$ and the power converter then controls the current reference in order to achieve the correct fuel cell voltage as the fuel cell follows a linear characteristic in a $(v_{FC}, i_{FC})$ coordinate system. Since the dynamics of the fuel cell are very slow compared to the power converter capability, a simple and slow search algorithm is implemented for the voltage control. The voltage control steps the current reference in accordance with the mentioned linear characteristic towards the desired fuel cell voltage. It should be noted that the search algorithm does not need any information on the internal fuel cell resistance but only information of its maximum current and the operating voltage range of the fuel cell to avoid overloading the fuel cell. An analog PI-controller 50 then controls the inductor current in accordance with the reference given by the microprocessor through a D/A-converter.

In the following, the snubber circuit of the push pull converter will be dealt with in detail by reference to FIG. 8. The snubber consists of resistor 51, capacitor 52 and diodes 53 and 54. The energy, which flows in the snubber circuit capacitor during normal operation, depends only on the leakage inductance of each primary winding, and is dependent on load condition.

As a high internal resistance characterizes the characteristic of the fuel cell, it is expected that the power flow in the snubber circuit will increase drastically, when the operating point is getting close to the maximum power. This depends on the leakage inductance of the half split primary winding of the transformer 10 ($L_{trafo}$), on the value of the switching frequency $f_{sw}$ and on the current, which is braked.

$$P_{clamp} = 2 \cdot f_{sw} \cdot \frac{L_{trafo}}{2} \cdot \frac{\left(I_{FC} + \frac{\Delta I_{ripp}}{2}\right)^2}{2} \quad (3)$$

Requirements for the adaptive load in the snubber circuit are to limit the voltage level in order to provide safe operation for the switches and also to maintain a higher voltage in the snubber capacitor 52, which will force a faster turn-off and therefore lower switching losses and also keep the snubber circuit blocked from working as a rectifier when the voltage across the primary reflects the conduction of the diode rectifier in the secondary winding. Therefore, the voltage in the snubber circuit should be maintained high in a wide range of power levels. Experiments on the transformers are carried out by adapting the value of the load in order to maintain the voltage in the snubber capacitor at a desired value. The load consists in a variable resistor to feed back energy to the fuel cell, with a maximum value of 8.8 kΩ, which may be decreased in order to increase consumption.

Figure 12:
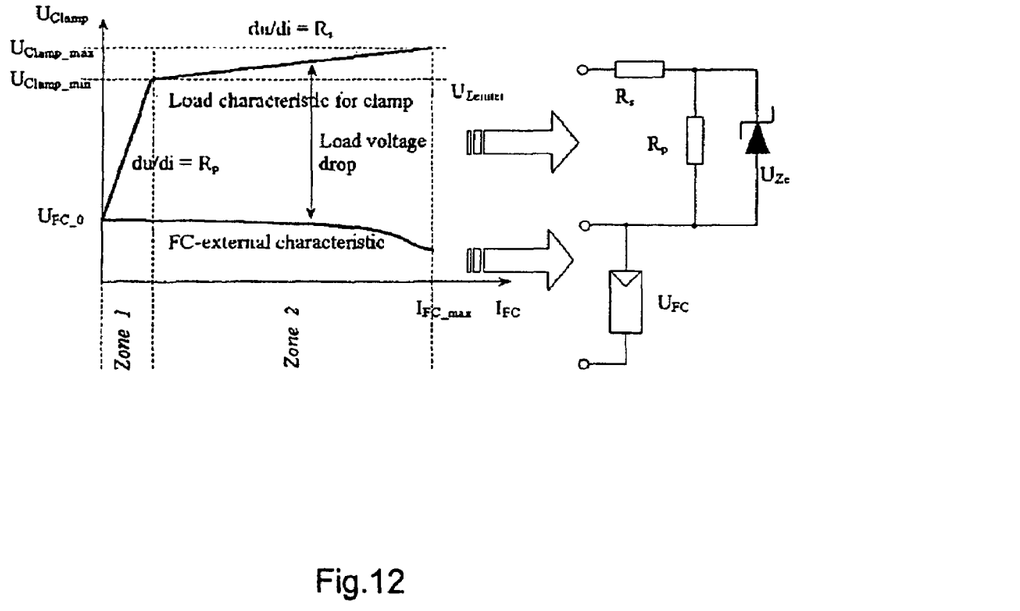
FIG. 12 shows the ideal characteristic of a load for a snubber circuit and its practical implementation for use in a push pull converter.

An ideal characteristic of the load for the snubber circuit is presented in FIG. 12 and the practical implementation is depicted in the right side.

The meaning of the elements in the circuit: The zener diode is necessary to ensure that the load will work only for voltage levels higher than the reflected voltage from the secondary side and below the maximum allowable voltage. At low power, it is necessary to by-pass the zener diode with a parallel resistor Rp, in order to discharge the clamp capacitor, as well as to decrease the power dissipation in the zener diode at higher voltage drop level.

A series resistance Rs is necessary to adapt the external characteristic of the fuel cell. Because the energy from this load applied to the snubber circuit is wasted, a circuit could be introduced which uses a part of this energy to feed a small fan for cooling of the power transformer of the push pull converter. A comparator senses when the amount of energy in the snubber circuit, which is proportional to the fuel cell current, increases, which means that the power processed by the push pull converter increases and losses in the transformer increase. Then the fan is supplied and starts cooling the transformer. The overall effciency of the push pull converter is not affected.

Turning again to FIG. 8, the LCL filter 47 will now be discussed.

In order to maintain a sinusoidal grid current with low harmonic distortion and a high power factor, the inverter is controlled to emulate a negative resistance towards the grid. The size of the emulated resistor is determined by the DC-link voltage controller, which tries to maintain a constant DC-link voltage. This is however not possible, while the power into the DC-link is constant and the power out of the DC-link is a second powered sinusoidal with an amplitude of two times the average power.

For that reason a ripple is present. In order to lower the transmitted high frequency current ripple, due to the operation of the inverter, an LCL filter is inserted between the grid and the inverter. The LCL filter may be regarded as an inductor for frequencies slightly below the resonant frequency of the filter; hence the control of the filter becomes easy. On the other side, the z-plane poles for the filter, even with parasitic resistances, lie close to the border of the unit-circle. Adding a resistance in parallel with the outer inductor $Z_g$ in the LCL filter shows to improve the stability at the cost of a slightly higher loss. A 1 kW power converter was designed and implemented. The result shows that the LCL filter is stable when the damping-resistor is added. The total harmonic current distortion was measured below 4.0 and the power factor is better than 0.99 for an input power above 300 W.

The LCL filter of FIG. 8 has the following components in the s-domain:

$$\begin{cases} Z_i = R_i + L_i s \\ Z_g = R_g + L_g s \\ Z_o = 1/Cs \end{cases} \quad (4)$$

where $L_i$ has a value of 4.0 mH, $R_i$ 400 mΩ, $L_g$ 850 μH, $R_g$ 180 mΩ and C 2.2 μF. In the general case all passive elements are treated as impedances.

Transfer functions have been derived for the LCL filter for the purpose of current control. The transfer functions link the two filter terminal voltages (grid voltage and inverter voltage) to the corresponding inductor currents.

A comparison between the established third order functions and an inductive equivalent shows that below the resonance frequency a single inductor-resistor equivalent is an adequate approximation of the inverter voltage to inverter current but in order to describe/analyse stability the LR circuit is not adequate near the resonance frequency of the LCL filter.

Looking at the amplitude responses it has been found, that damping of the filter can be utilized in order to improve the stability of the current loop. As mentioned a resistor in parallel with the inductor Zg (FIG. 8) towards the grid is added. In the ideal case where parasitic conducting resistors are omitted, the impedance Zg can be written as follows:

$$Z_g = L_g s \mid \mid R_d = \frac{L_g s R_d}{L_g s + R_d} \quad (5)$$

where Rd is the damping resistor. Damping is introduced of the open loop poles at unity proportional gain. Of course as the damping resistor increases the poles and zeros move towards undamped positions. It can be observed that the open loop poles without damping are placed very close to the border of stability. One might choose a damping resistor with a low value. But since the power dissipation in the damping resistor increases and filter attenuation decreases, as the resistor value decreases, there exists a trade off between stability, efficiency and filter attennuation. A damping resistor of Rd=38Ω has been chosen.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A power converter for transforming energy from a green power unit into energy fed to a grid, the power converter comprising a DC/DC-converter which forms a first module and a DC/AC-inverter which forms a second module, wherein the first module comprises a first controller and power switches controlled by said first controller, that the second module comprises a second controller and power switches controlled by said second controller, that the first and second controller perform communication with each other via a communication bus and that the first module further comprises a transformer connected to the corresponding switches, said transformer transferring energy to the second module; and
   wherein an interface between the first and the second module is formed between a rectifier on the first module and a DC-bus on the second module.

2. The power converter according to claim 1, wherein the first module comprises an inverter which is current sourced and that the second module comprises an inverter which is voltage sourced.

3. The power converter according to claim 2, wherein the first and the second controller communicate via a galvanically separated serial bus.

4. The power converter according to claim 2, wherein the DC/DC-converter comprises an H-bridge consisting of power switches.

5. The power converter according to claim 2, wherein the DC/DC-converter comprises a push pull converter.

6. The power converter according to claim 1, wherein the first module comprises an integrated power module that incorporates an H-bridge of power switches and a full bridge rectifier.

7. The power converter according to claim 1, wherein two first modules are electrically connected to the second module.

8. The power converter according to claim 1, wherein the second controller controls the inverter of the second module by means of two control loops, a current control loop regulating the shape of current supplied to the grid similar to the shape of the grid voltage, and a voltage control loop regulating the amplitude of the current supplied to the grid.

9. The power converter according to claim 1, wherein the first controller is connected to minus of the first module, and that the second controller is connected to minus of the second module.

10. A power converter for transforming energy from a green power unit into energy fed to a grid, the power converter comprising a DC/DC-converter which forms a first module and a DC/AC-inverter which forms a second module, wherein the first module comprises a first controller and power switches controlled by said first controller, that the second module comprises a second controller and power switches controlled by said second controller, that the first and second controller perform communication with each other via a communication bus and that the first module further comprises a transformer connected to the corresponding switches, said transformer transferring energy to the second module;
   wherein the first module comprises an inverter which is current sourced and that the second module comprises an inverter which is voltage sourced; and
   wherein an actual amplitude of a voltage ripple on the DC voltage of the second module, or an actual phase angle of a ripple on the power delivered to the grid, is measured and converted into a duty cycle compensation value which is added to a duty cycle of the switches of the first module.

11. A power converter for transforming energy from a green power unit into energy fed to a grid, the power converter comprising a DC/DC-converter which forms a first module and a DC/AC-inverter which forms a second module, wherein the first module comprises a first controller and power switches controlled by said first controller, that the second module comprises a second controller and power switches controlled by said second controller, that the first and second controller perform communication with each other via a communication bus and that the first module further comprises a transformer connected to the corresponding switches, said transformer transferring energy to the second module;
   wherein the first module comprises an inverter which is current sourced and that the second module comprises an inverter which is voltage sourced; and
   wherein a snubber circuit is placed in front of the inverter of said converter.

12. The power converter according to claim 11, wherein the snubber circuit comprises a switch connected to a snubber capacitor storing energy from the transformer, that the switch is connected to the first controller, and that the first controller pulse width modulates the switch through which energy from the capacitor is led to the DC-input of the converter.

13. The power converter according to claim 12, wherein the first controller calculates a voltage set point as a function of the voltage supplied from the green power unit, and that the switch is modulated to keep a voltage across the capacitor corresponding to said voltage set point.

14. A power converter for transforming energy from a green power unit into energy fed to a grid, the power converter comprising a DC/DC-converter which forms a first module and a DC/AC-inverter which forms a second module, wherein the first module comprises a first controller and power switches controlled by said first controller, that the second module comprises a second controller and power switches controlled by said second controller, that the first and second controller perform communication with each other via a communication bus and that the first module further comprises a transformer connected to the corresponding switches, said transformer transferring energy to the second module;
   wherein the first module comprises an inverter which is current sourced and that the second module comprises an inverter which is voltage sourced; and
   wherein the DC/DC-converter is started in a discontinuous current mode during which a duty cycle is increased by a duty cycle generator until a limit value is reached, that the DC/DC-converter is operated on this limit value for a first time period, whereafter in a second time period it is operated in a continuous current mode.

15. A power converter for transforming energy from a green power unit into energy fed to a grid, the power converter comprising a DC/DC-converter which forms a first module and a DC/AC-inverter which forms a second module, wherein the first module comprises a first controller and power switches controlled by said first controller, that the second module comprises a second controller and power switches controlled by said second controller, that the first and second controller perform communication with each other via a communication bus and that the first module further comprises a transformer connected to the corresponding switches, said transformer transferring energy to the second module;
  wherein the first module comprises an inverter which is current sourced and that the second module comprises an inverter which is voltage sourced;
  wherein the first and the second controller communicate via a galvanically separated serial bus; and
  wherein a man-machine interface module is connected to the serial communication bus.

16. A power converter for transforming energy from a green power unit into energy fed to a grid, the power converter comprising a DC/DC-converter which forms a first module and a DC/AC-inverter which forms a second module, wherein the first module comprises a first controller and power switches controlled by said first controller, that the second module comprises a second controller and power switches controlled by said second controller, that the first and second controller perform communication with each other via a communication bus and that the first module further comprises a transformer connected to the corresponding switches, said transformer transferring energy to the second module;
  wherein the first module comprises an inverter which is current sourced and that the second module comprises an inverter which is voltage sourced;
  wherein the DC/DC-converter comprises a push pull converter; and
  wherein the DC/DC-converter is started in a discontinuous current mode during which a duty cycle is increased by a duty cycle generator until a limit value is reached, whereafter the DC/DC-converter enters a continuous current mode in which the duty cycle generator freely generates the duty cycle to regulate the current in the DC/DC-converter.

17. The power converter according to claim 16, wherein the limit value is a minimum simultaneous conduction time or minimum overlap in duty cycle of the switches in the DC/DC-converter.

18. The power converter according to claim 17, wherein after reaching the limit value the duty cycle generator keeps the duty cycle approximately constant at a minimum overlap for a period of time during a transition zone between the discontinuous current mode and the continuous current mode.

19. A power converter for transforming energy from a green power unit into energy fed to a grid, the power converter comprising a DC/DC-converter which forms a first module and a DC/AC-inverter which forms a second module, wherein the first module comprises a first controller and power switches controlled by said first controller, that the second module comprises a second controller and power switches controlled by said second controller, that the first and second controller perform communication with each other via a communication bus and that the first module further comprises a transformer connected to the corresponding switches, said transformer transferring energy to the second module;
  wherein the first module comprises an inverter which is current sourced and that the second module comprises an inverter which is voltage sourced;
  wherein the DC/DC-converter comprises a push pull converter; and
  wherein a current reference for the current in a coil of the push pull converter is regulated stepwise until an optimum operating voltage of the green power unit is reached.

20. A power converter for transforming energy from a green power unit into energy fed to a grid, the power converter comprising a DC/DC-converter which forms a first module and a DC/AC-inverter which forms a second module, wherein the first module comprises a first controller and power switches controlled by said first controller, that the second module comprises a second controller and power switches controlled by said second controller, that the first and second controller perform communication with each other via a communication bus and that the first module further comprises a transformer connected to the corresponding switches, said transformer transferring energy to the second module;
  wherein the first module comprises an inverter which is current sourced and that the second module comprises an inverter which is voltage sourced;
  wherein the DC/DC-converter comprises an H-bridge consisting of power switches; and
  wherein at least one current sensor, preferably a shunt, is inserted in the minus conductor of the inverter of the first module and the inverter of the second module respectively, and that the current signals are led to the first and second controller respectively.

21. A power converter for transforming energy from a green power unit into energy fed to a grid, the power converter comprising a DC/DC-converter which forms a first module and a DC/AC-inverter which forms a second module, wherein the first module comprises a first controller and power switches controlled by said first controller, that the second module comprises a second controller and power switches controlled by said second controller, that the first and second controller perform communication with each other via a communication bus and that the first module further comprises a transformer connected to the corresponding switches, said transformer transferring energy to the second module; and
  wherein a filter is inserted between an output of the inverter on the first module and the grid, said filter comprising a sequence of a first coil, a capacitor and a second coil.

22. The power converter according to claim 21, wherein a damping resistor is connected in parallel with the second coil.

* * * * *